United States Patent
Halim et al.

(10) Patent No.: US 10,049,140 B2
(45) Date of Patent: Aug. 14, 2018

(54) ENCODING SYSTEM, METHOD, AND RECORDING MEDIUM FOR TIME GRAMS

(71) Applicant: International Business Machines Corporation, Armonk, NY (US)

(72) Inventors: Nagui Halim, Yorktown Heights, NY (US); Srinivasan Parthasarathy, Yonkers, NY (US); Venkata N. Pavuluri, New Rochelle, NY (US); Daby Mousse Sow, Croton-on-Hudson, NY (US); Deepak Srinivas Turaga, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 14/839,730

(22) Filed: Aug. 28, 2015

(65) Prior Publication Data
US 2017/0060962 A1    Mar. 2, 2017

(51) Int. Cl.
*G06F 17/30* (2006.01)
(52) U.S. Cl.
CPC ............... *G06F 17/30551* (2013.01)
(58) Field of Classification Search
CPC ......... G06F 17/30536; G06F 17/30539; G06F 17/30548; G06F 17/30551; G06F 17/30563; G06F 17/30569; G06F 17/30572; H03M 7/30
USPC ....... 707/602, 674, 679, 681, 685, 693, 802, 707/809; 705/50; 709/223
See application file for complete search history.

(56) References Cited

U.S. PATENT DOCUMENTS

| | | | | |
|---|---|---|---|---|
| 5,487,754 A | * | 1/1996 | Snell | A61N 1/37 607/27 |
| 7,292,960 B1 | * | 11/2007 | Srinivasa | G06Q 10/06 340/500 |
| 8,099,512 B2 | * | 1/2012 | Katis | H04L 12/1831 709/203 |
| 8,112,425 B2 | * | 2/2012 | Baum | G06F 17/30551 707/746 |
| 8,180,774 B2 | * | 5/2012 | Hendrickson | H03M 7/04 707/737 |
| 8,200,797 B2 | | 6/2012 | Meng et al. | |

(Continued)

FOREIGN PATENT DOCUMENTS

WO    WO 2015/021485 A1    2/2015

OTHER PUBLICATIONS

"Grammar-Based Codes: A New Class of Universal Lossless Source Codes"; John C. Kieffer and Enhui Yang, Jan. 24, 2014.

(Continued)

*Primary Examiner* — Greta L Robinson
(74) *Attorney, Agent, or Firm* — Kurt Goudy, Esq.; McGinn I.P. Law Group, PLLC.

(57) ABSTRACT

An encoding system for encoding an event time series, the system including an inter-arrival time computing device configured to compute an inter-arrival time between a plurality of input events and computes a sequence of events, a transformation device configured to transform the inter-arrival time between the plurality of input events into discrete time symbols, and a mapping device configured to map the input events and the discrete time symbols using a dictionary to output a time gram.

17 Claims, 10 Drawing Sheets

(56) References Cited

U.S. PATENT DOCUMENTS

| | | | | |
|---|---|---|---|---|
| 2009/0265684 A1* | 10/2009 | Fuchs | ................. | G06F 8/10 |
| | | | | 717/105 |
| 2014/0297323 A1 | 10/2014 | Hu et al. | | |
| 2015/0039625 A1* | 2/2015 | Nisbet | ................. | G06F 9/542 |
| | | | | 707/746 |
| 2015/0088941 A1* | 3/2015 | Stokely | ............ | G06F 17/30194 |
| | | | | 707/827 |
| 2016/0210333 A1* | 7/2016 | Wang | ............... | G06F 17/30539 |

OTHER PUBLICATIONS

"Identifying Hierarchical Structure in Sequences: A Linear-time Algorithm"; Craig G. Nevill-Manning and Ian H. Witten, Sep. 1997.

"Patterns Relevant to the Temporal Data-Context of an Alarm of Interest"; Savo Kordic, Chiou Peng Lam, Jitian Xiao, and Huaizhong Li, 2010.

Thomas Guyet, Ren'e Quiniou. "Mining temporal patterns with quantitative intervals." 4th International Workshop on Mining Complex Data, (IEEE ICDM) Workshop, 2008, Italy. pp. 10, 2008.

\* cited by examiner

ENCODING SYSTEM, METHOD, AND RECORDING MEDIUM FOR TIME GRAMS

STATEMENT REGARDING FEDERALLY SPONSORED RESEARCH OR DEVELOPMENT

This invention was made with Government support under Contract No. H98230-14-D-0038 awarded by the Department of Defense. The Government has certain rights to this invention.

BACKGROUND

The present invention relates to encoding an event time series using a dictionary, and more specifically, to discovering temporal patterns across multiple time series while taking into account event inter-arrival times.

Conventionally, methods for encoding multiple events arriving from compact temporal patterns or arriving from ordered stream of vectors create a dictionary with symbols for representing temporal pattern of events in a compact and understandable manner. The conventional methods merely take into account the sequential order of events.

However, the aforementioned conventional methods do not consider temporal aspects of the data, and especially do not transform inter-arrival time between events into discrete symbols. For example, the conventional methods do not calculate the time between events and the conventional methods only focus on the sequential order of the events.

Other conventional methods to encoding an event time series provide a compact model representing pattern and duration of events such as conventional data mining.

However, these other conventional methods deal with creating a statistical model (mixture model) from various event sequences, while they fail to consider encoding a given event sequence. The present inventors have recognized that the problem with conventional data mining is that the temporal dimension between the sequences of events is not considered. For example, the conventional methods only map the sequence of the events without taking into consideration the inter-arrival times between the events.

SUMMARY

In view of the foregoing and other problems, disadvantages, and drawbacks of the aforementioned background art, an exemplary aspect of the disclosed invention provides a system, method, and non-transitory recording medium for encoding time grams. More specifically, the system, method, and non-transitory recording medium that can encode multiple discrete time series of events including the inter-arrival times between the events into compact temporal patterns for the purpose of calculating meaningful patterns within the data.

In an exemplary aspect, the present invention provides an encoding system for encoding an event time series, the system including an inter-arrival time computing device configured to compute an inter-arrival time between a plurality of input events and computes a sequence of events, a transformation device configured to transform the inter-arrival time between the plurality of input events into discrete time symbols, and a mapping device configured to map the input events and the discrete time symbols, using a dictionary, to output a time gram.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
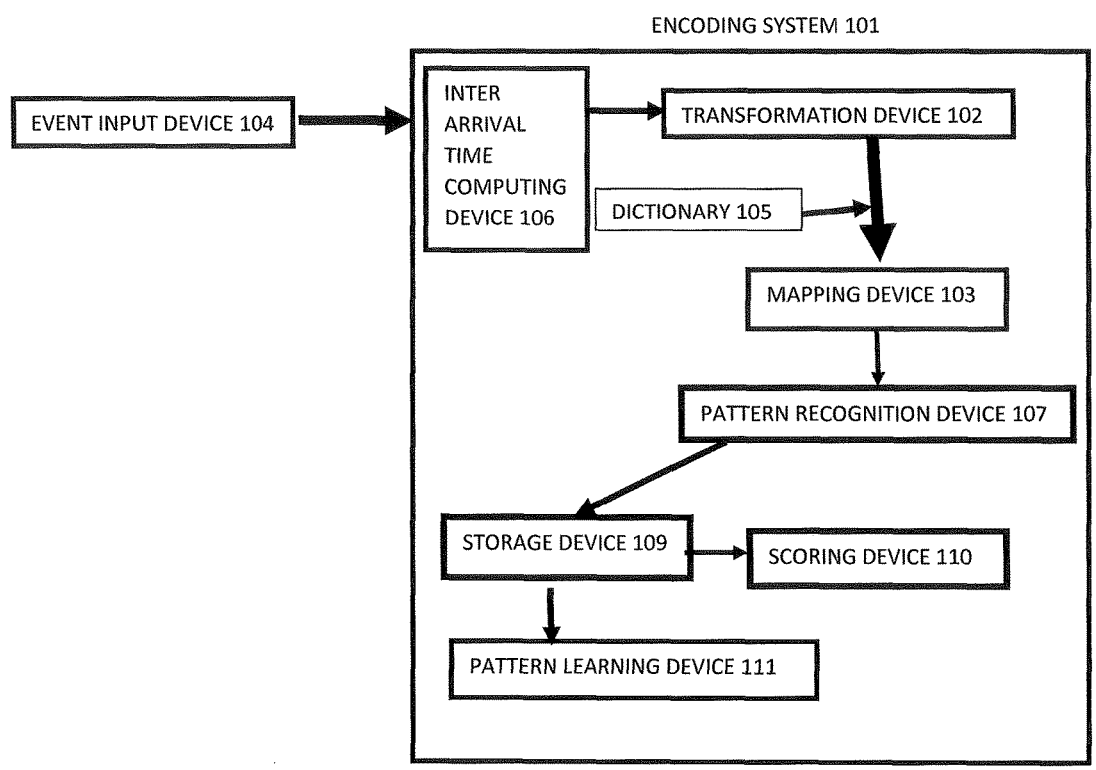
FIG. 1 exemplarily shows a block diagram illustrating the configuration of an encoding system according to an exemplary embodiment of the present invention.

The invention will now be described with reference to the drawing Figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

For the purposes of this invention a time gram is an extension of N-gram concept for temporal event sequences. That is to say, a time gram is a representation of event patterns that encode both event sequences and time-gaps between events.

With reference now to FIG. 1, the encoding system 101 includes a transformation device 102, a mapping device 103, an inter-arrival time computing device 106, a dictionary device 105, a pattern recognition device 107, a storage device 109, a scoring device 110, and a pattern learning device 111. The encoding system 101 includes a processor 180 and a memory 190, the memory 190 storing instructions to cause the processor 180 to execute each device of the encoding system 101.

Figure 8:
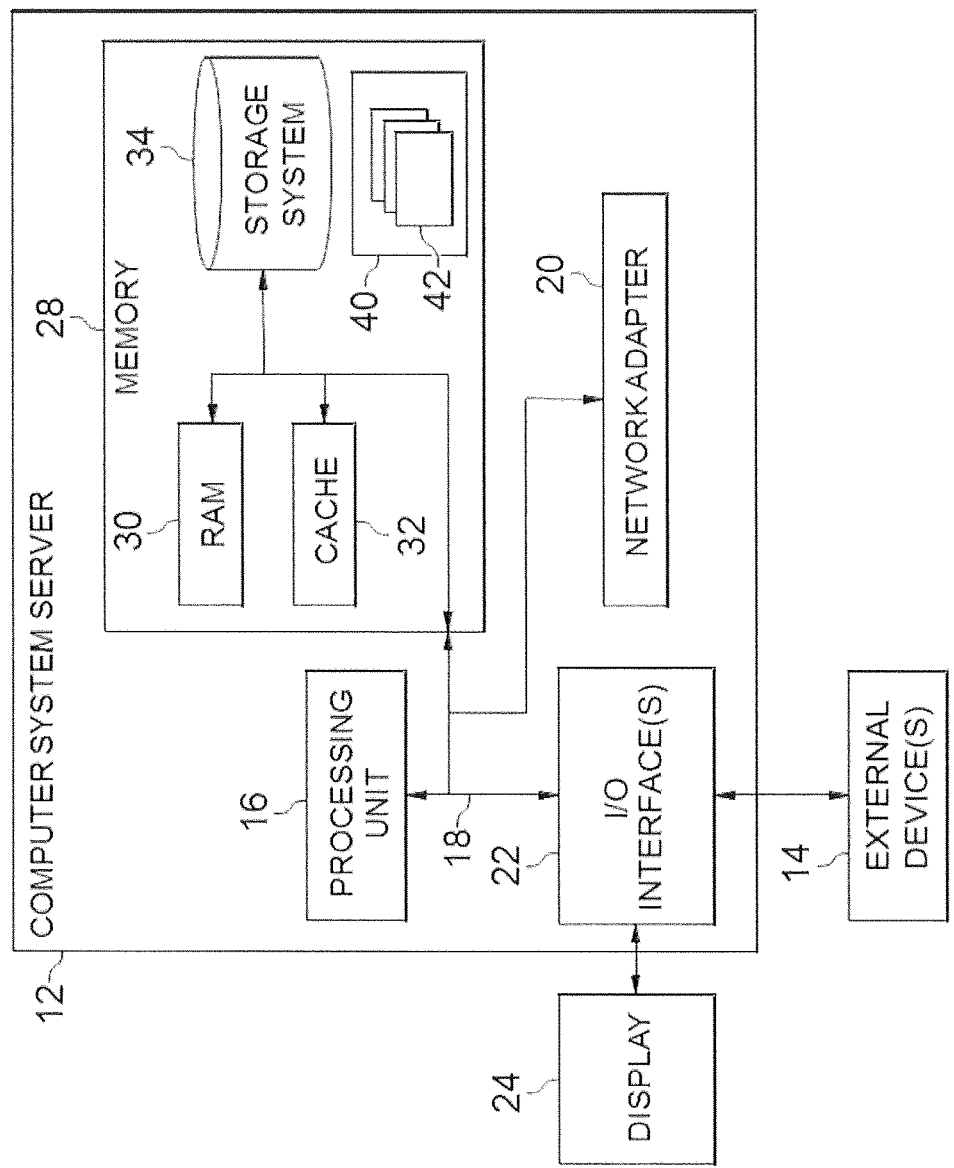
FIG. 8 depicts a cloud computing node according to an embodiment of the present invention.
Figure 9:
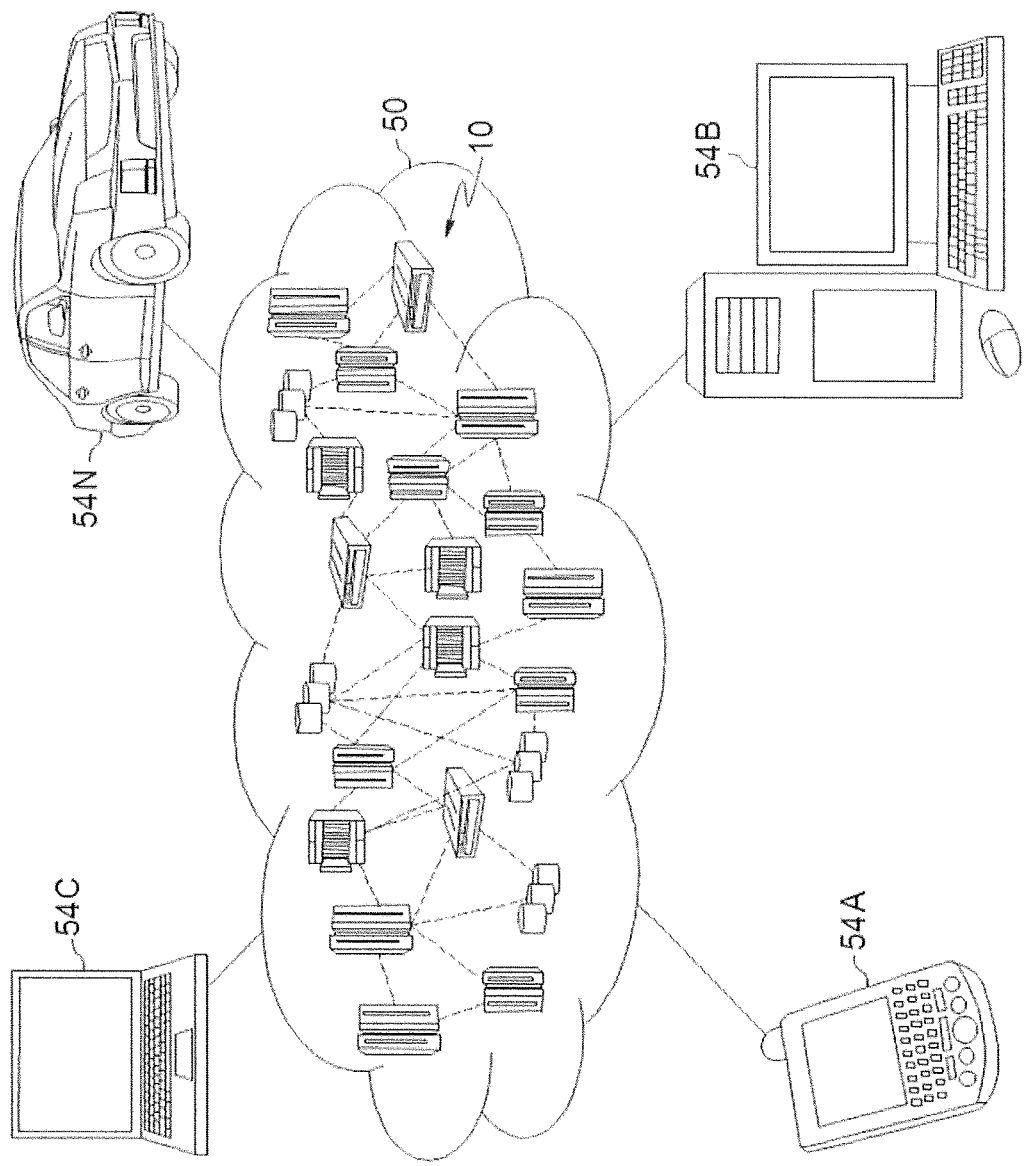
FIG. 9 depicts a cloud computing environment according to an embodiment of the present invention.
Figure 10:
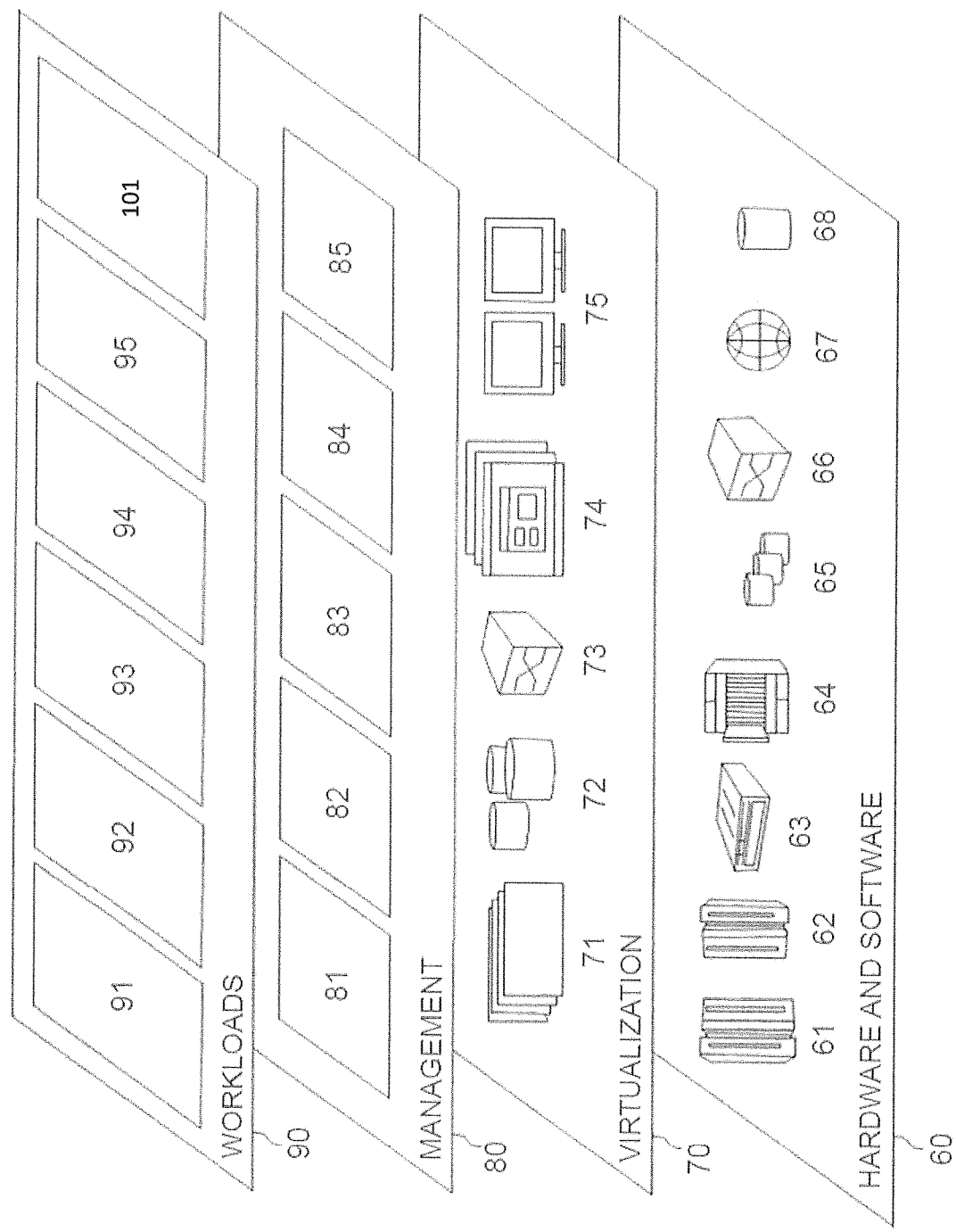
FIG. 10 depicts abstraction model layers according to an embodiment of the present invention.

Although as shown in FIGS. 8-10 and as described later, the computer system/server 12 is exemplarily shown in cloud computing node 10 as a general-purpose computing device which may execute in a layer the discrepancy detection system 101 (FIG. 10), it is noted that the present invention can be implemented outside of the cloud environment.

The inter-arrival time computing device 106 receives event input data from the event input device 104. The event input data may include, for example, a type of event and a time stamp of when the event occurred. That is, each event input into the encoding system includes the type of event and the time stamp of when the event occurred. The inter-arrival time computing device 106 computes the inter-arrival time between the events and computes a sequence of events. For example, if event A occurs at 10:01 and event B occurs at 10:02, the inter-arrival time computing device 106 calculates a 1 minute inter-arrival time between event A and event B.

The transformation device 102 receives the sequence of events from the inter-arrival time computing device 106. The transformation device 102 transforms the sequence of events into discrete time symbols. For example, the transformation device 102 may transform the event "High Heart Rate" to "ART HI" with a one minute inter-arrival time until the next event "Low Heart Rate" which is transformed to "HR LO". The one minute inter-arrival time between the events may be transformed to, for example, "min_1" as a time gap symbol.

The transformation device 102 performs the transformation by quantizing the time symbols between two events. For example, the transformation device 102 quantizes 60.234 seconds between two events as 1 minute, 10.345 seconds as 10 seconds, 56 seconds as 1 minute, etc. That is to say, the transformation device 102 quantizes the inter-arrival times into discrete time symbols that represent a meaningful time between events based on the domain that the events apply to and transforms the sequence of events output from the inter-arrival time computer device 106 to introduce time gaps symbols in the sequences such that the sequence can be input into the pattern recognition device 107.

The transformation device 102 includes lossless or lossy compression techniques. For example, lossy compression on the time dimension via quantization and lossy compression on names of symbols (i.e., after the mapping device 103 clusters symbol names). The quantization can be based on at least one of a history, a context, and semantics such that the quantization by the transformation device dynamically is updated.

Figure 3:
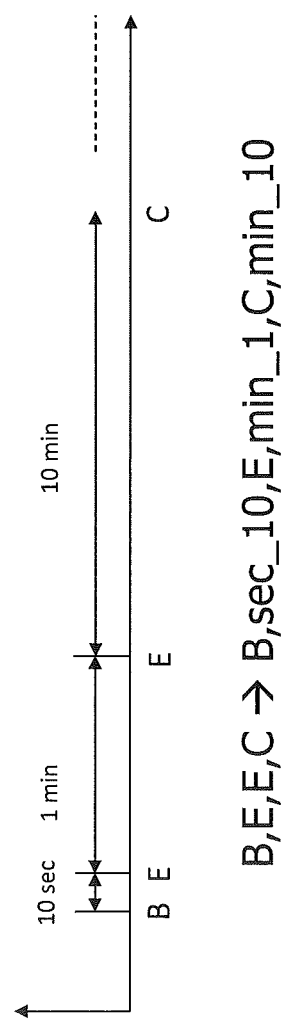
FIG. 3 exemplarily illustrates transforming the events and inter-arrival times into discrete time symbols.

FIG. 3 exemplarily illustrates the transformation device 102 transforming the events and inter-arrival times into discrete time symbols. FIG. 3 depicts events, B, E, E, and C. There is a 10 second inter-arrival time between events B and E, a 1 minute inter-arrival time between events E and E, and a 10 minute inter-arrival time between events E and C. As exemplarily shown in FIG. 3, the transformation device transforms the inter-arrival times into discrete time symbols, sec_10, min_1, min_10 such that calculations be performed.

As shown in FIG. 3, the 10 second inter-arrival time may be 10.345 seconds between events B and E but the transformation device 102 quantizes the inter-arrival time into the 10 second inter-arrival time and further into the discrete time symbol, sec_10. The transformation device 102 is capable of transforming time into discrete symbols using hours, minutes, seconds or any meaningful time in the applied field. In other words, the discrete time symbols are dependent on the applied field and can be dynamically quantized into any set of inter-arrival times.

The transformed data by the transformation device 102 is coupled with the dictionary 105 and input into the mapping device 103.

The dictionary 105 includes, for example, rules, patterns, and grammars for event sequence defining. A grammar may be, for example, a type of rule that allows the mapping device 103 to produce a sequence that is desired (for example, context free grammar). The dictionary is constructed using a combination of pattern mining algorithms such as sequitur, Ngrams, LZ and/or other compression schemes applied to the event and time symbols (i.e., the modified sequitur algorithm as later described). The dictionary can include multiple data combined data sets based on frequently mined matching rules. The dictionary can evolve dynamically over time based on the pattern recognition device 107 and scoring device 110. Or, a user can manually input new constraints for the dictionary to follow.

The mapping device 103 maps the input events and the time symbols of the sequence output from the transformation device 102 using the dictionary 105. The mapping device 103 introduces symbol sets or grammar rules to group events together that are close in their inter-arrival time and also maps the sequence of events with the inter-arrival times to be used by the pattern recognition device 107. The threshold to group events close in their inter-arrival time is dynamic. For example, all events within 10 seconds may be grouped, all events within 1 minute may be grouped together, or any inter-arrival time may be specified to group two events together by the mapping device 103.

The mapping device 103 may further map input events based on a pre-determined rule in the dictionary 105. For example, a rule can be input into the dictionary 105 that HR LO and HR BRADY will always be grouped together regardless of the inter-arrival time therebetween. That is to say, the mapping device 103 can group events together based on the relationship between the events and not only based on the inter-arrival times between events.

The mapping device 103 can recursively apply the mapping such that the output time gram is used as an input into a second event sequence to be re-run through the encoding system 101.

Figure 4:
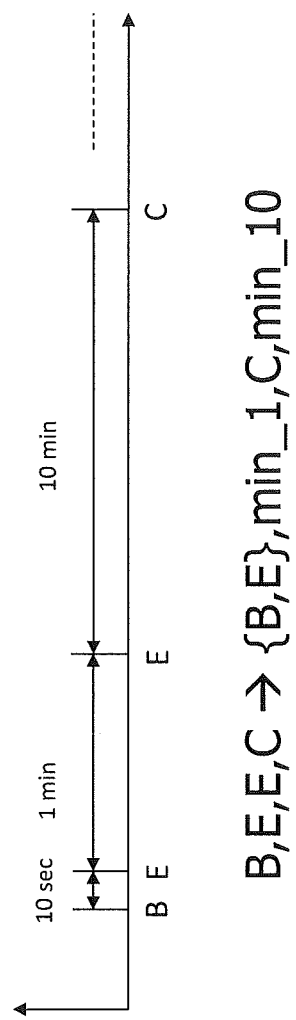
FIG. 4 exemplarily illustrates grouping events together based on inter-arrival time therebetween.

Referring to FIG. 4, the mapping device 103 exemplarily maps events B and E together since the inter-arrival time between the events is within a pre-determined threshold. The mapping device 103 maps the events B or E as {B,E},min_1 since event E occurring 10 seconds after B is determined to occur at a same time. Because events B and E occur within a pre-determined threshold of inter-arrival time between each other, the events are grouped together and a new sequence is formed. In other words, if B or E or both B and E occur at the same time, the mapping device 103 groups the events together to form a new sequence. The mapping device 103 can apply different thresholds of inter-arrival times to group events together.

In this manner, either one of B or E may occur to identify a pattern when running the algorithm of the pattern recognition device 107.

The mapping device 103 outputs the event sequence (i.e., time gram) with the inter-arrival times and events to the pattern recognition device 107. The pattern recognition device 107 uses a pre-determined algorithm for flexible pattern discovery such as sequitur, LZ, Ngrams, or other known flexible pattern discovery techniques. The time gram can be further annotated to capture domain specific semantics.

Figure 5:
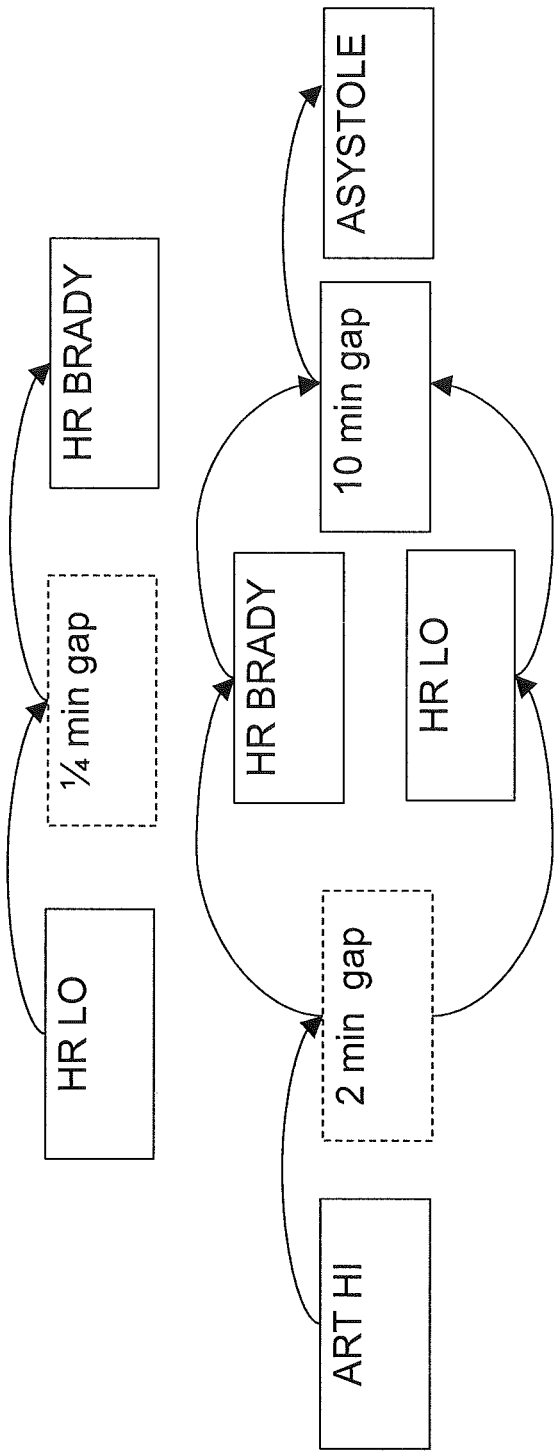
FIG. 5 exemplary shows a first time gram output for a pattern output from the pattern recognition device 107.
Figure 6:
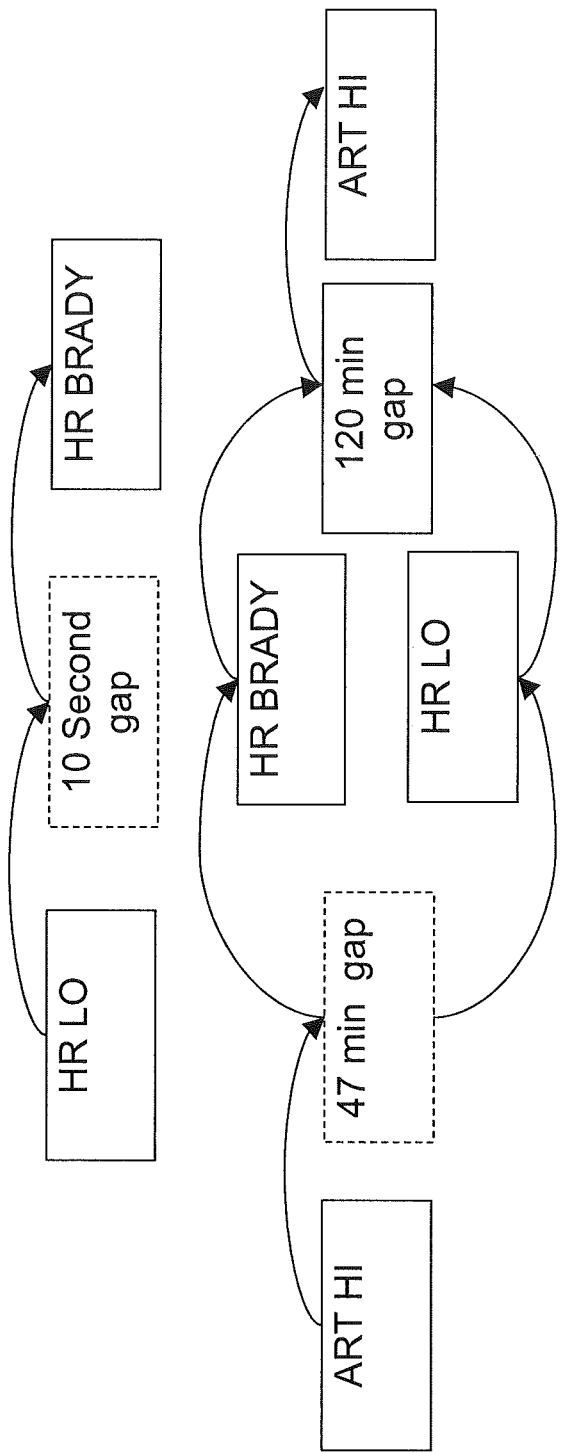
FIG. 6 exemplary shows a second time gram output for a pattern output from the pattern recognition device 107.

FIG. 5 and FIG. 6 depicts exemplary outputs for a pattern output from the pattern recognition device 107. Referring specifically to FIG. 5, the mapping device 103 sets the events of HR BRADY and HR LO as a group event together since their inter-arrival time is 15 seconds, or within a pre-determined threshold. The pattern recognition device 107 detects the pattern that when there is an ART HI event (i.e., high blood pressure) and then the group of events of HR BRADY (i.e., bradycardia) and HR LO (i.e., low blood pressure) occur 2 minutes later, there will be an ASYSTOLE (i.e., flat-line) event 10 minutes later.

An important aspect to note is that conventional techniques merely recognize that the events occur sequentially. Therefore, conventional methods are unable to identify the pattern that ART HI occurring 2 minutes before HR BRADY and HR LO may result in a flat-line. In other words, conventional methods would not be able to differentiate between an ART HI occurring 2 minutes or 2 days before an HR BRADY and HR LO since conventional methods do not take into account the inter-arrival times and includes the transformation device 102 that transforms the inter-arrival time into discrete time symbols. The symbolic representation of time allows for better pattern recognition using the algorithms in the pattern recognition device 107.

Also, the mapping device 103 grouping HR BRADY and HR LO simplifies the time gram output and allows for easier pattern recognition by the pattern recognition device 107.

The pattern recognition device 107 outputs the recognized patterns to a storage device 109. The scoring device 110 analyzes the stored patterns in the storage device 109 to determine the likelihood of an event occurring based on the recognized patterns. Based on the stored patterns, the scoring device 110 will assign a probability that an event will occur as the events occur in real-time. That is to say, the scoring device 110 will assign a probability that ASYSTOLE will occur based on the pattern recognized in the time gram of ART HI, min_2, {HR BRADY, HR LO}. However, the time gram sequence of ART HI, min_2, {HR BRADY, HR LO} may occur in a different pattern and the scoring device 110 will accordingly assigned a probability that a different next event will occur.

The scoring device 110 assigns the probability that a next event will occur dynamically as more events occur. For example, say events A, B, C occur with inter-arrival times matching 100 different patterns stored in the storage device 109. The probability that the next event will occur in one of the stored patterns is 1%. Then, even D occurs with an inter-arrival time and the number of patterns matching events A, B, C, D with the respective inter-arrival times is reduced to 3. Then, the scoring device 110 assigns a new probability of 33% that the next event will be one of 3 events in the 3 stored patterns.

The probability is output to the pattern learning device 111. Based on the probabilities and the dynamic aspect of the probabilities, the pattern learning device 111 can predict the inter-arrival time until a next event of the recognized pattern in real-time.

In this manner, referring back to FIG. 3, the pattern learning device 111 can predict that a flat-line (ASYSTOLE) will occur approximately 10 minutes after the events of ART HI, min_2, {HR BRADY, HR LO} occur. The pattern learning device 111 utilizes the probabilities calculated by the scoring device 110 to predict in real-time the likelihood that a recognized pattern will occur as sequence occurs of the recognized patterns.

Beyond the conventional flexible pattern discovery techniques, the pattern recognition device can also use a modified sequitur algorithm.

The inventors have extended sequitur algorithm for the generation of time grams by adding at least two new procedures. Thus, a modified sequitur algorithm has been created (i.e., O-CFG algorithm).

Firstly, prior to the execution of the classical algorithm, the modified sequitur algorithm modifies the input sequence by encoding time gaps into symbols. By encoding these time gaps, the modified sequitur algorithm essentially maps a time series (which is a sequence of pairs where is pair consists of a timestamp and a value) into a sequence of symbols.

Second, for symbols that are close into time (meaning that they are separated by time gaps symbols that maps to small gaps), the modified sequitur algorithm merges these symbols into a set. The resulting sequence is now a sequence of sets of symbols separated by larger time gaps symbols.

The modified sequitur algorithm allows set comparisons when the algorithm compares different symbols. Different set comparison techniques can be used here, ranging from perfect set matching to approximate matching using distances such a the Jaccard or Cosine similarity distances. For example, a regex engine can be used for the matching.

To illustrate the modified sequitur algorithm, consider the following time series that we would like to encode:
  1, A
  5, B
  6, A
  15, C
  16, D
  20, A
  23, B
  . . .

The first column is the timestamp while the second column consists of symbols representing some events.

In the first part of the modified sequitur algorithm, the modified sequitur algorithm transforms this time series into the following sequence:
  gap_1,A,gap_4,B,gap—1,A,gap_9,C,gap_1,D,gap_4,A, gap_3,B, . . .

In the second part of the modified sequitur algorithm, assuming that we do not care about the order for gaps that are less or equal to 1 in time, the modified sequitur algorithm transforms the sequence further into the following sequence of sets:
  gap_1, {A},gap_4,{B,A},gap_9,{C,D},gap_4,{A}, gap_3,{B}, . . .

In order to extract time grams, the sequitur (or any other algorithm, for that matter) is then modified to match sets (e.g. matching {B,A} and {A} or matching {C,D} and {B,A}) instead of matching symbols.

Set matching can be done either perfectly (meaning that two sets would match only they are equal) or imperfectly, thus allowing a bit of distortion (e.g., {A} is included in {A,B}; therefore, we allow the match.

In another example, {A,B,C,D} and {A,B,C} differ only by one element, therefore the modified sequitur algorithm allows the match.

Figure 7:
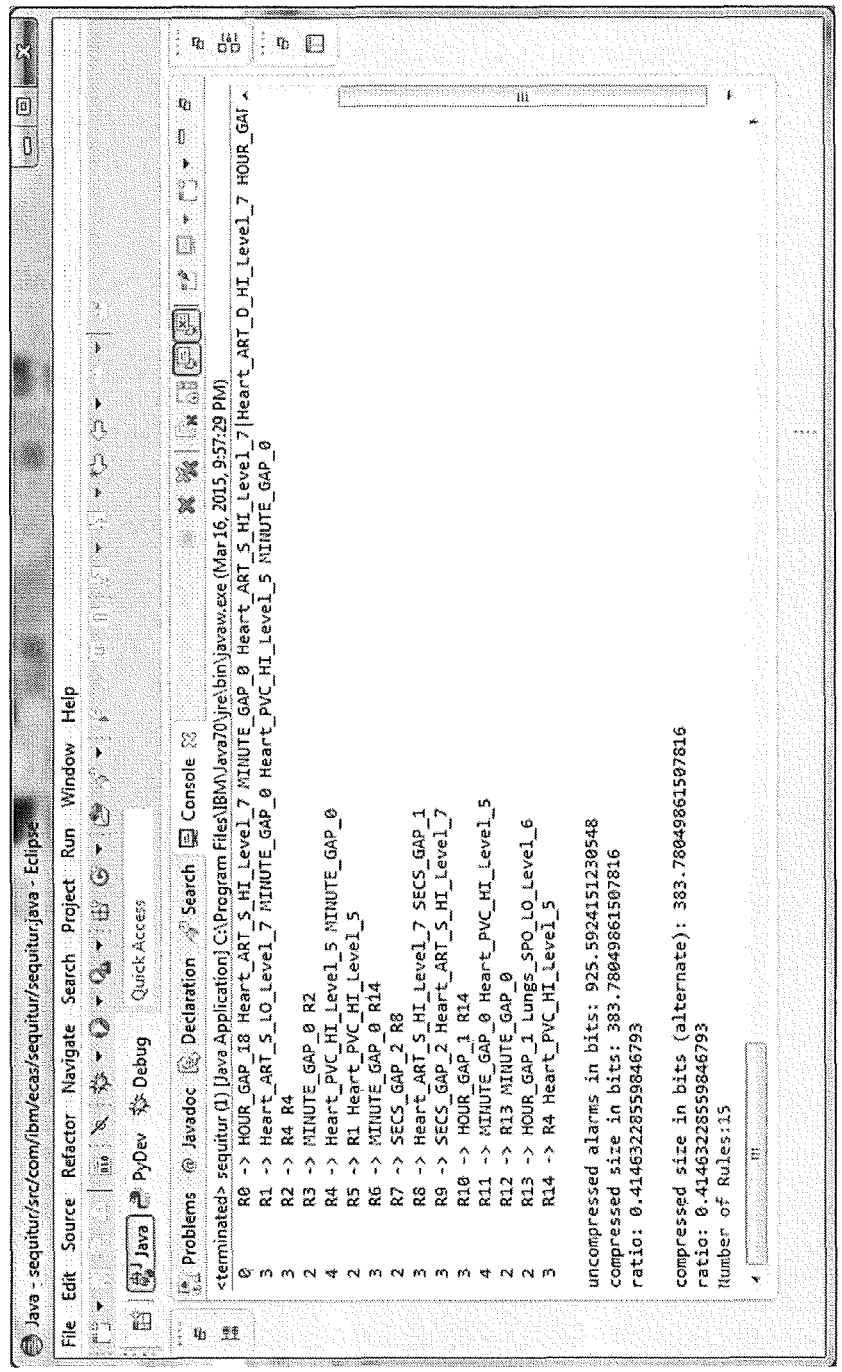
FIG. 7 depicts an exemplarily representation of the modified sequitur algorithm O-CFG algorithm.

FIG. 7 depicts an exemplarily representation of the modified sequitur algorithm O-CFG algorithm.

Figure 2:
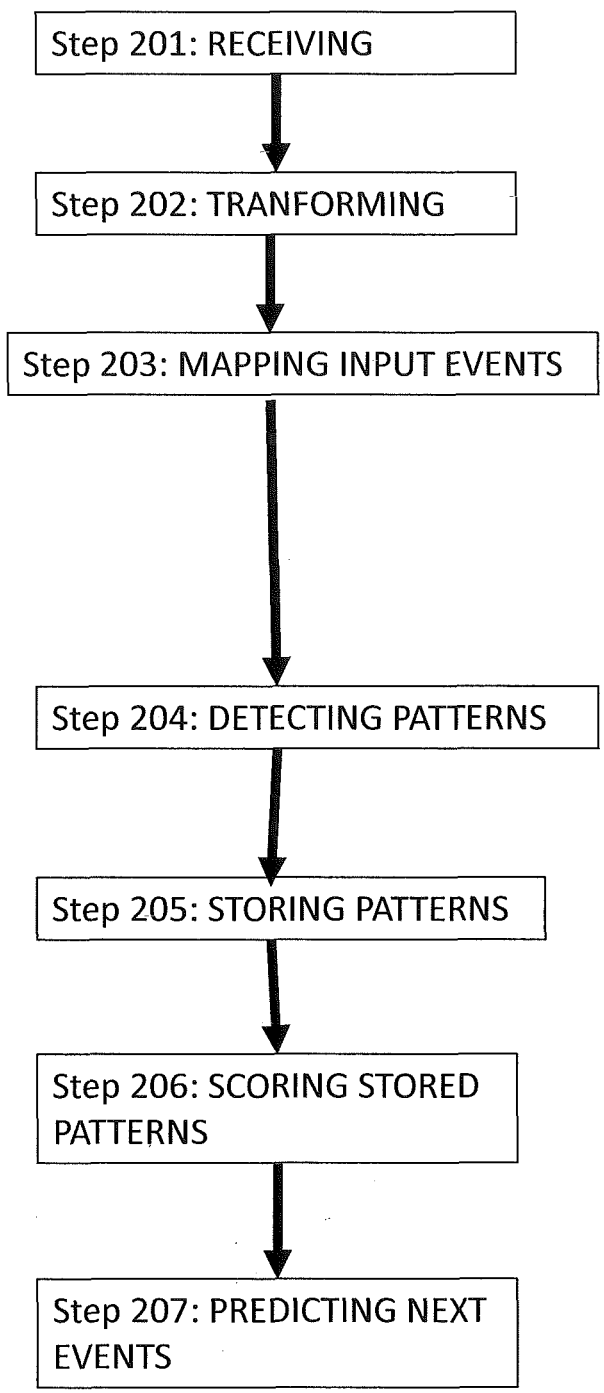
FIG. 2 exemplarily shows a flow chart for an encoding system.

FIG. 2 shows a high level flow chart for an encoding method 200.

Step 201 receives event input data from the event input device 104

Step 202 transforms the sequence of events received from the event input device 104 into discrete time symbols Step 203 maps the input events and the time symbols of the sequence output using a dictionary to include the inter-arrival times between the events.

Step 204 detects and recognizes patterns from the mapped input events in step 203.

Step 205 stores the recognized patterns from step 204.

Step 206 scores the stored patterns in step 205 to determine the likelihood of an even occurring based on all the recognized patterns stored in step 205.

Step 207 predicts the inter-arrival time until a next event based on the recognized pattern scores in step 206 in real-time.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include and could populate with modules of the present invention: mapping and navigation 91; software development and lifecycle management 92; virtual classroom education delivery 93; data analytics processing 94; transaction processing 95; and, more particularly relative to the present invention, encoding system 101 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Examples herein are directed towards an Intensive Care Unit (ICU), however the encoding system should not be limited thereto and can be applied to any domain that has events and time to recognize patterns.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An encoding system including a processor and a memory for encoding an event time series, the system comprising:
    a processor, and
    a memory, the memory storing instructions to cause the processor to:
        compute, using said processor, an inter-arrival time between each of a plurality of input events and computes a sequence of events;
        transform, using said processor, each of the inter-arrival times between the plurality of input events into discrete time symbols by quantizing the time symbols between two events, each discrete time symbol representing one inter-arrival time of the computed inter-arrival times between two of the input events; and
        map, using said processor, the input events and the discrete time symbols using a dictionary to output a time gram,
        wherein the mapping introduces symbol sets and grammar rules to group the plurality of input events together that have a predetermined threshold inter-arrival time and also maps a sequence of events with the inter-arrival times for recognized out of sequence patterns between the inter-arrival times between the plurality of input events.

2. The encoding system according to claim 1, wherein the dictionary comprises at least one of rules, patterns, and grammars.

3. The encoding system according to claim 1, wherein the dictionary dynamically evolves based on previously mapped time grams by the mapping.

4. The encoding detection system according to claim 1, wherein the dictionary comprises a combination of pattern mining algorithms including at least one of sequitur, Ngrams, and LZ.

5. The encoding system according to claim 4, wherein a regex engine is used in the pattern mining algorithms.

6. The encoding system according to claim 4, wherein the dictionary comprises multiple data combined-data sets based on frequently-mined matching rules.

7. The encoding system according to claim 1, wherein the memory further stores instructions to cause the processor to recursively apply the mapping such that the output time gram is used as an input into a second event sequence.

8. The encoding system according to claim 1, wherein the time gram is further annotated to capture domain specific semantics.

9. The encoding system according to claim 1, wherein the transforming includes lossless or lossy compression such that the original time series is recoverable after the mapping outputs the time gram.

10. The encoding system according to claim 1, wherein the memory further stores instructions to cause the processor to recognize, using said processor, patterns in the time gram output by the mapping.

11. The encoding system according to claim 10, wherein the memory further stores instructions to cause the processor to store patterns, using said memory, in the time gram output by the mapping recognized by the pattern recognition.

12. The encoding system according to claim 11, wherein the memory further stores instructions to cause the processor to store analyze, using said processor, the stored patterns in a storage device and score a probability that an event will occur next based on the stored patterns.

13. The encoding system according to claim 12, memory further stores instructions to cause the processor to learn and predict, using said processor, based on the probability output by the scoring, the an inter-arrival time until a next event of the recognized pattern will occur.

14. The encoding system according to claim 13, wherein the memory further stores instructions to cause the processor to transform predicts the next event in real-time.

15. The encoding system according to claim 1, wherein the quantization is based on at least one of a history, a context, and semantics such that the quantization by the transforming dynamically updates.

16. A method for encoding an event time series, the method comprising:
    transforming, using a processor, each of the inter-arrival times between the plurality of input events into discrete time symbols by quantizing the time symbols between two events each discrete time symbol representing one inter-arrival time of the computed inter-arrival times between two of the input events; and mapping the plurality of input events and the discrete time symbols using a dictionary to output a time gram, wherein the main introduces symbol sets and grammar rules to group the plurality of input events together that have a predetermined threshold inter-arrival time and also maps a sequence of events with the inter-arrival times for recognized out of sequence patterns between the inter-arrival times between the plurality of input events.

17. A non-transitory computer-readable recording medium recording an encoding program for encoding an event time series, the program causing a computer to perform:

transforming, using a processor, each of the inter-arrival times between the plurality of input events into discrete time symbols by quantizing the time symbols between two events, each discrete time symbol representing one inter-arrival time of the computed inter-arrival times between two of the input events; and mapping the plurality of input events and the discrete time symbols using a dictionary to output a time gram, wherein the mapping introduces symbol sets and grammar rules to group the plurality of input events together that have a predetermined threshold inter-arrival time and also maps a sequence of events with the inter-arrival times for recognized out of sequence patterns between the inter-arrival times between the plurality of input events.

* * * * *